United States Patent
Danneberg et al.

(10) Patent No.: US 12,337,393 B2
(45) Date of Patent: Jun. 24, 2025

(54) TOOL HEAD

(71) Applicant: Bayerische Motoren Werke Aktiengesellschaft, Munich (DE)

(72) Inventors: Frank Danneberg, Ergolding (DE); Wolfram Wagener, Geisenhausen (DE); Patrick Woisetschlaeger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1148 days.

(21) Appl. No.: 16/740,264

(22) Filed: Jan. 10, 2020

(65) Prior Publication Data

US 2020/0147697 A1    May 14, 2020

Related U.S. Application Data

(63) Continuation of application No. PCT/EP2018/067861, filed on Jul. 3, 2018.

(30) Foreign Application Priority Data

Jul. 12, 2017 (DE) .................... 10 2017 211 878.4

(51) Int. Cl.
| | |
|---|---|
| B23B 27/24 | (2006.01) |
| B23B 41/12 | (2006.01) |
| B23P 9/02 | (2006.01) |
| C23C 4/02 | (2006.01) |

(52) U.S. Cl.
CPC .............. *B23B 27/24* (2013.01); *B23B 41/12* (2013.01); *B23P 9/02* (2013.01); *C23C 4/02* (2013.01); *B23B 2215/24* (2013.01); *B23B 2220/44* (2013.01); *B23P 2700/50* (2013.01)

(58) Field of Classification Search
CPC ........................................................ B23B 41/12
USPC ............................................................ 72/112
See application file for complete search history.

(56) References Cited

U.S. PATENT DOCUMENTS

| | | | | |
|---|---|---|---|---|
| 2010/0031799 | A1* | 2/2010 | Ast .................. | B24B 33/08 83/851 |
| 2010/0101526 | A1* | 4/2010 | Schaefer ............ | C23C 4/02 123/193.2 |
| 2012/0317790 | A1* | 12/2012 | Flores ............... | B23B 29/03464 29/558 |

(Continued)

FOREIGN PATENT DOCUMENTS

| | | |
|---|---|---|
| CN | 101628343 A | 1/2010 |
| CN | 102806465 A | 12/2012 |

(Continued)

OTHER PUBLICATIONS

English-language Chinese Office Action issued in Chinese application No. 201880040354.5 dated Feb. 20, 2021 (Seven (7) pages).

(Continued)

*Primary Examiner* — Bobby Yeonjin Kim
*Assistant Examiner* — P Derek Pressley
(74) *Attorney, Agent, or Firm* — Crowell & Moring LLP

(57) ABSTRACT

A tool head includes a first tool and a second tool disposed circumferentially on the tool head where the tool head has a rotation axis. The first tool of the tool head is an adjustable tool that is radially movable such that a radial position, relative to the second tool of the tool head, is settable.

6 Claims, 1 Drawing Sheet

(56) References Cited

U.S. PATENT DOCUMENTS

2014/0050544 A1* 2/2014 Nedzlek .................. B23B 41/12
408/1 R

FOREIGN PATENT DOCUMENTS

| | | | |
|---|---|---|---|
| CN | 103028749 A | 4/2013 | |
| CN | 103442823 A | 12/2013 | |
| DE | 10 2004 007 476 A1 | 9/2005 | |
| DE | 102008024313 A1 * | 12/2009 | ............... B21H 7/00 |
| DE | 20 2009 014 180 U1 | 1/2010 | |
| DE | 20 2010 010 740 U1 | 1/2012 | |
| DE | 10 2012 211 074 A1 | 1/2014 | |
| DE | 10 2014 223 038 A1 | 5/2016 | |
| WO | WO 2012/084612 A1 | 6/2012 | |

OTHER PUBLICATIONS

English-language Chinese Office Action issued in Chinese application No. 201880040354.5 dated Oct. 11, 2021 (Eight (8) pages).
PCT/EP2018/067861, International Search Report dated Sep. 7, 2018 (Two (2) pages).
German Search Report issued in German counterpart application No. 10 2017 211 878.4 dated Mar. 12, 2018, with Statement of Relevancy (Nine (9) pages).
U.S. Patent Application, "Tool Head", filed Jan. 10, 2020, Inventor Frank Danneberg et al.

* cited by examiner

TOOL HEAD

CROSS REFERENCE TO RELATED APPLICATIONS

This application is a continuation of PCT International Application No. PCT/EP2018/067861, filed Jul. 3, 2018, which claims priority under 35 U.S.C. § 119 from German Patent Application No. 10 2017 211 878.4, filed Jul. 12, 2017, the entire disclosures of which are herein expressly incorporated by reference.

BACKGROUND AND SUMMARY OF THE INVENTION

The present invention relates to a tool head, to a method for machining an inner surface of a cylinder, and to a use of a tool head.

The cylinders in question are, in particular, the cylinders of internal combustion engines. It is state of the art to provide the cylinder inner surfaces, in particular of aluminum crankcases, with a coating, for example applied by means of a thermal spraying process, this coating process being preceded by activation of the cylinder inner surface to ensure the adhesion of the coating. In this context, it is known to roughen the cylinder running surfaces, by means of high-pressure water-jet technology, before coating. This process, however, is highly dependent on the quality of the casting. Moreover, the process-related necessary input of investment, energy and resources is problematic. A more recent approach consists in mechanical machining of the cylinder wall before coating, in particular, for example, applying grooves that, in a subsequent forming or deforming step, are possibly also deformed so as to produce undercuts that are intended to enable the coating to grip. Thus, in certain circumstances, some of the aforementioned disadvantages may be eliminated. The difficulty, however, is to ensure that the coating will last reliably over the entire service life.

It is therefore an object of the present invention to specify a tool head, a method for machining an inner surface of a cylinder, and a use of a tool head that eliminate the aforementioned disadvantages and that, at the same time, can be realized in a simple and inexpensive manner.

According to the invention, arranged circumferentially on a tool head, which has a rotation axis, there are at least one first and at least one second tool, wherein the at least one first tool is an adjustable tool that is arranged in a radially movable manner, enabling a radial position, relative to the at least one second tool, to be altered, or set. In particular, it is possible to set an engagement sequence or machining sequence, or engagement depth or machining depth, or an effective force, such as a forming or penetration force, of the adjustable tool with respect to a surface to be machined. This is advantageous, in particular, in the machining of cylinders of internal combustion engines, since it is thus possible to control the machining of a cylinder wall/cylinder surface, taking account of the direction of advance, or the tools used. Thus, for example, during insertion into a cylinder, the adjustable tool may be set such that it machines the cylinder surface whereas, while being withdrawn from the cylinder, it is set such that it does not machine the cylinder surface, or machines it less deeply or less intensely, or vice versa, etc. During withdrawal from the cylinder, it is then, for example, the at least one second tool that is principally active. Machining in at least two stages is thus rendered possible, by means of only one tool head.

Expediently, the first and second tool or tools are arranged in a rotatable manner in the tool head. The tools may be mounted via a rolling bearing arrangement. According to a preferred embodiment, they are mounted only on plain bearings.

According to an embodiment, the first tool is provided with an adjusting unit that is designed actively to move, or displace, the at least one adjustable tool in the radial direction, wherein this adjusting unit may be realized electrically, hydraulically and/or pneumatically.

According to a preferred embodiment, the adjustable tool is supported, toward the rotation axis, on a cone, and is expediently arranged so as to be axially movable, in such a manner that the radial orientation (in relation to each other) can be set in dependence on a direction of advance of the tool head. The adjustable tool is thus supported on the cone in the radial direction, or toward the rotation axis, as viewed, as it were, inward in the direction of the rotation axis, the at least one adjustable tool being arranged so as to be movable in the axial direction. It is thus possible to realize the adjusting unit in a structurally very simple manner, since the radial adjustment is ultimately rendered possible indirectly, by the axial movement capability and the fact that the at least one adjustable tool can be supported on the cone. According to a preferred embodiment, the at least one adjustable tool is arranged with play in the axial direction, for example in a correspondingly realized (bearing) cage, or in general has an adjustment distance, whereby the radial position can be set, depending on a direction of advance of the tool head. The magnitude of the adjustment distance depends on the dimensions of the tool head, and according to some embodiments is in the range of a few millimeters. Thus, expediently, the at least one adjustable tool is mounted on the cone with play in the axial direction, as a result of which its engagement depth, for example with respect to a cylinder wall to be machined, can be set relative to the at least one second tool, in particular can be changed quasi-automatically, depending on the direction of advance of the tool.

For the purpose of machining the cylinder, the tool head, according to an embodiment, expediently connected, or driven, via a machine tool or a machining center, etc., is put into rotation and inserted into the respective cylinder. Preferred rotational speeds are in a range of from preferably 500 to 1500 l/min. Advantageously, the tools, since they are arranged, or mounted, in a rotatable manner in the tool head, are in this case automatically put into a rotary motion by the contact with the cylinder wall. Expediently, therefore, there is no need for them to have their own drive. The great advantage then consists in that, as a result of the at least one adjustable tool being mounted with play, an automatic reorientation of the adjustable tool is also effected, depending on a direction of advance of the tool head. Since the adjustable tool is supported on the cone, however, not only is an axial repositioning achieved, but also a radial repositioning, which means that the adjustable tool, depending on the design, or orientation, of the cone, is automatically inserted or withdrawn, without a further drive or the like being required for this purpose. This approach makes it possible to realize an extremely robust and simply constructed tool head.

According to an embodiment, a radial position or location of the at least one second tool is defined. Preferably, the axial and the radial position are defined. Thus, in particular, the at least one roughening tool is mounted in a fixed manner, wherein the expression "fixed" does not imply absence of play. There may well be play present, but for example it primarily serves the purpose of, in particular, rotatable, arrangement, and not axial or radial adjustment. Alternatively, both a radial and an axial movement capability may be provided, whereby radial adjustment of the at least one second tool is rendered possible.

According to an embodiment, the tool head has an upper and a lower base plate, arranged between which is a conical basic body, in or on which the tools are arranged and mounted. Alternatively, the aforementioned basic body may be surrounded by an additional bearing ring or cage that, additionally or alternatively, is used for arranging and/or mounting the tools. As another alternative, the tools may also be mounted, at least partly, via the upper and the lower base plate, the upper base plate expediently having a suitable connection region for arrangement of the tool on, for example, a tool spindle. The basic structure of the tool is not limited to the aforementioned variants, but may be realized in a great many ways, in particular owing to the effective basic concept.

According to a preferred embodiment, the adjustable tool is a forming tool, and the second tool is a roughening tool. Particularly preferably, a multiplicity of forming tools, for example 5-10, and a multiplicity of roughening tools, in the same number, are arranged, or provided, circumferentially and alternately on the tool head. According to an embodiment, the tools have a substantially conical basic body, or tool body, that is congruent with the aforementioned cone of the tool head. In particular, according to an embodiment, the basic body of the at least one second tool, thus preferably of the roughening tool, is also cylindrical, as a result of which the production costs can be reduced. If necessary, the aforementioned play can very easily be set over the length of the conical or cylindrical tool body of the tools, such that otherwise no further adaptations are necessary on the tool head, or on a corresponding bearing portion, bearing ring or (bearing) cage of the tool head, in or on which the tools are arranged. In the case of preferred embodiments, a length of the tool bodies is approximately 5 to 30 mm, particularly preferably approximately 10 to 20 mm. Typical diameters are approximately 5 to 20 mm, preferably approximately 8 to 15 mm.

The advantages of such a tool head are evident, in particular, in connection with the activation of cylinder running surfaces/inner surfaces for subsequent coating, for example by means of thermal spraying processes. As mentioned at the beginning, for the purpose of activating the cylinder inner surface it is known to apply a structure, for example in the form of grooves, or webs, by mechanical machining, prior to the subsequent (thermal) coating. Preferably, the webs can then be deformed, by means of the tool head, or its forming tools, in such a manner that undercuts are produced. In other words, following the forming operation the grooves have an approximately swallow-tail shape in cross section. In order then to further improve the attachment, or gripping, of the subsequent coating, the roughening tools are provided, which structure, or roughen, the webs and which, besides the macro form-grip that is formed by the undercuts, additionally provide for a micro form-grip. Then, since the forming tool or tools is/are radially adjustable, forming of the ridges may be effected, for example, during insertion, whereas structuring of the surface is effected, by means of the roughening tools, during withdrawal from the cylinder, as a result of the forming tools reversing, owing to the change in the direction of advance. The machining sequence may easily be set via the orientation of the conical basic bodies of the tools, etc. (cf. tapering upward or downward, etc.).

According to an embodiment, the first and the second tool have engagement regions, wherein the engagement regions are preferably cylindrical. The engagement regions are, in particular, those regions of the tools by means of which the actual machining is effected, i.e., that are designed, for example, to bear against the surface to be machined. The cylindrical shape makes it possible, in particular, for the engagement regions to be positioned and oriented in an exact manner in relation to each other.

According to an embodiment, the engagement regions each form effective diameters, wherein, owing to the radial positioning capability, an effective diameter of the first tool may both be greater and less than an effective diameter of the second tool, in particular as a result of provision of an appropriate under-dimension or over-dimension. Depending on the embodiment, the values are, for example, in a range of from approximately 0.01 to 1 mm, preferably in a range of from approximately 0.02 to 0.5 mm. According to an embodiment, a diameter of the engagement region of the forming tool is, for example, 0.1 to 0.3 mm less than the diameter of the roughening tool.

According to various embodiments, in particular for the machining of crankcases/cylinders of passenger-car engines, the effective diameters are approximately 70 to 100 mm. In the case of motorcycle engines, the diameters may be significantly smaller, or also significantly larger in commercial vehicle engineering or in the case of large engines. However, the basic structure does not change as a result.

According to an embodiment, an engagement region, or the engagement region, of the at least one second tool, in particular of the roughening tool, is coated, or is formed by a coating, or has protuberances, projections, ridges, flutes and/or the like. Preferably, the engagement region of the roughening tool is diamond-coated or particle-coated, in least in regions. In the case of the diamond coating, preferred mean grain sizes are in a range of from D91 to D301.

An engagement region, or the engagement region, of the first tool, or forming tool, has a substantially smooth, or flat, surface. Preferably, as mentioned, the engagement regions of the forming tools are likewise cylindrical.

In preferred embodiments, diameters of the engagement regions are in a range of from approximately 5 to 25 mm.

Alternatively, the engagement regions are formed directly on the basic bodies, or are formed by them. If the basic bodies are conical, they are expediently inclined, in relation to the rotation axis of the tool head, in such a manner that the circumferential surfaces on which the engagement regions are formed are approximately parallel to the surfaces to be machined.

Preferably, the first and/or the second tool are/is made of hard metal. It is thus possible, advantageously, to realize tools that have an extremely long service life.

According to an embodiment, the tool head comprises a drive unit, for driving one or more tools.

According to an embodiment, the tool head comprises a cooling means. In particular, the cooling means is designed to cool the circumferentially arranged tools. Such a cooling means is advantageous, in particular, if coated roughening tools are used, such as, for example, diamond-coated roughening tools, since it can thus be ensured that the coating, for example in the form of diamond, holds on the corresponding tool. Typical coolant flows in this case operate at a pressure of up to 80 bar. According to an embodiment, the coolant flow may be used to drive the tools. As mentioned at the beginning, according to an embodiment the rotatably arranged, or mounted, tools are driven as it were indirectly by the rotation of the tool head relative to the stationary cylinder wall. This results, during insertion into the cylinder, in a very pronounced rotational speed gradient. To that extent, a drive, or a certain impulsion, that puts the tools at least into a certain rotary motion has proved to be extremely advantageous in respect of the wear behavior.

The invention additionally relates to a method for machining an inner surface of a cylinder, in particular a cylinder of an internal combustion engine, comprising the steps:
providing a tool head that has a rotation axis and a multiplicity of circumferentially arranged tools;
preferably rotating the tool head and inserting it into a cylinder for the purpose of machining an inner wall of the cylinder; and
altering a radial position of at least one tool, relative to the other tool or tools, for the purpose of setting a machining sequence.

The at least one aforementioned tool that changes its radial position is expediently an adjustable tool, in particular an adjustable tool according to the invention.

Preferably, at least one tool is a roughening tool, and at least one tool is a forming tool, the method comprising the step:
reducing an effective diameter of the forming tool or forming tools during withdrawal from the cylinder.

It is thus possible, advantageously, for structuring, or roughening, of the surface of the cylinder to be effected as the tool head is being withdrawn from the cylinder. Accordingly, the method is advantageously conducted such that forming is effected only, or at least predominantly, during insertion. Expediently, the adjustable tools are arranged with axial play in the tool head, and are supported on an interior cone, as has already been described above. Expediently, in the case of this embodiment, the cone is oriented in such a manner that it decreases in size downward, relative to a vertical axis, or cylinder axis.

Alternatively and/or additionally, the method comprises the step:
increasing an effective diameter of the roughening tool or roughening tools during withdrawal.

This has the same effect as previously described, namely, that the roughening can advantageously be effected as the tool head is being withdrawn from the cylinder.

According to an embodiment, the method comprises the steps:
machining the cylinder wall for the purpose of applying a surface structure;
coating the inner wall of the cylinder following the machining by means of the tool head.

As already indicated, the surface structure comprises, for example, a multiplicity of grooves, or flutes, preferably applied mechanically. Alternatively or additionally, however, the structuring may also be effected by means of suitable laser technology. Preferably, thermal spraying is used for the coating operation, for example with so-called flame spraying, or plasma spraying, or arc wire spraying, being used. In this case, powder particles and/or wire particles are spun, or sprayed, with high thermal and kinetic energy onto the surface of the substrate to be coated. The coating is effected following machining of the cylinder wall by means of the tool head.

The invention is additionally directed toward the use of a tool head according to the invention for the purpose of producing an internal combustion engine, or a crankcase.

The advantages and features mentioned in connection with the tool head also apply analogously and correspondingly to the method and to the use, and vice versa and between each other.

Further advantages and features are given by the following description of preferred embodiments of a tool head, with reference to the appended figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
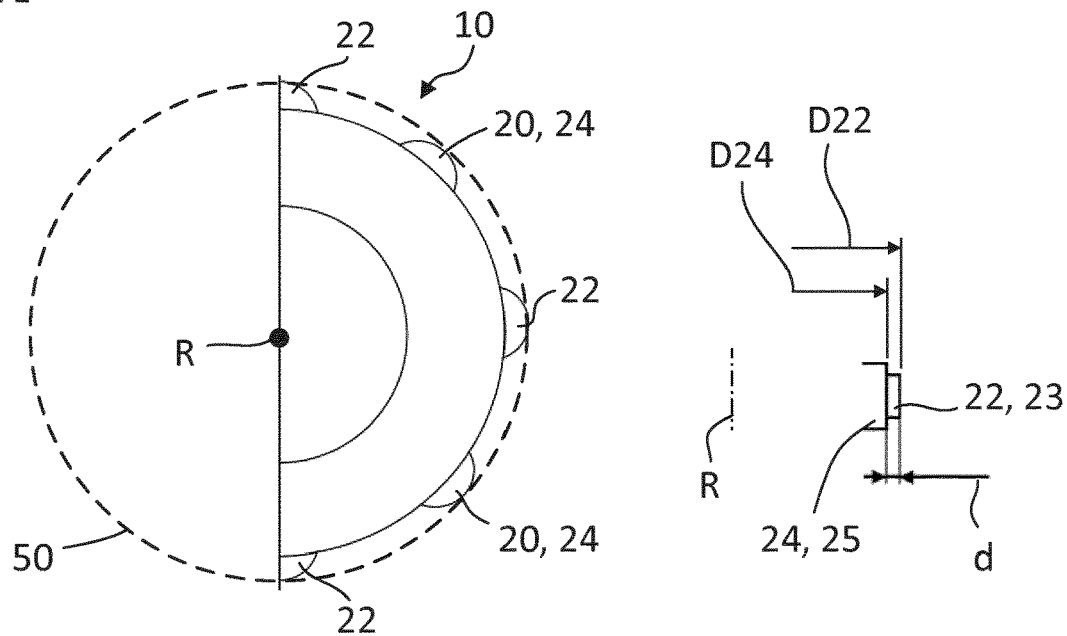
FIG. 1 is a partial top view of a tool head, as viewed along a rotation axis, and a detail view to illustrate the differing effective diameters of the tools.

Shown in FIG. 1, in the left half of the Figure, as viewed along a rotation axis R, is a tool head 10 having a multiplicity of circumferentially arranged first and second tools 20 and 22, respectively, wherein a roughening tool 22 and a forming tool 24 are shown alternately in each case. A cylinder wall 50, which is machined by means of the tool head 10, is represented by a broken line. Shown in outline in the right half of the Figure are a roughening tool 22 and a forming tool 24, with their respective engagement regions 23 and 25, respectively, wherein it is evident that the engagement region 23 of the roughening tool 22 projects over the engagement region 25 of the forming tool 24 by a radial offset d. In other words, an effective diameter D22 of the roughening tool 22 is greater than an effective diameter D24 of the forming tool 24. To aid orientation, the course of the rotation axis is again indicated by the reference R. The over-dimension, or the offset d, is, for example, in a range of from approximately 0.01 to 1 mm. This is obtained, for example, by radially shifting the forming tool 24 toward the rotation axis R.

Figure 2:
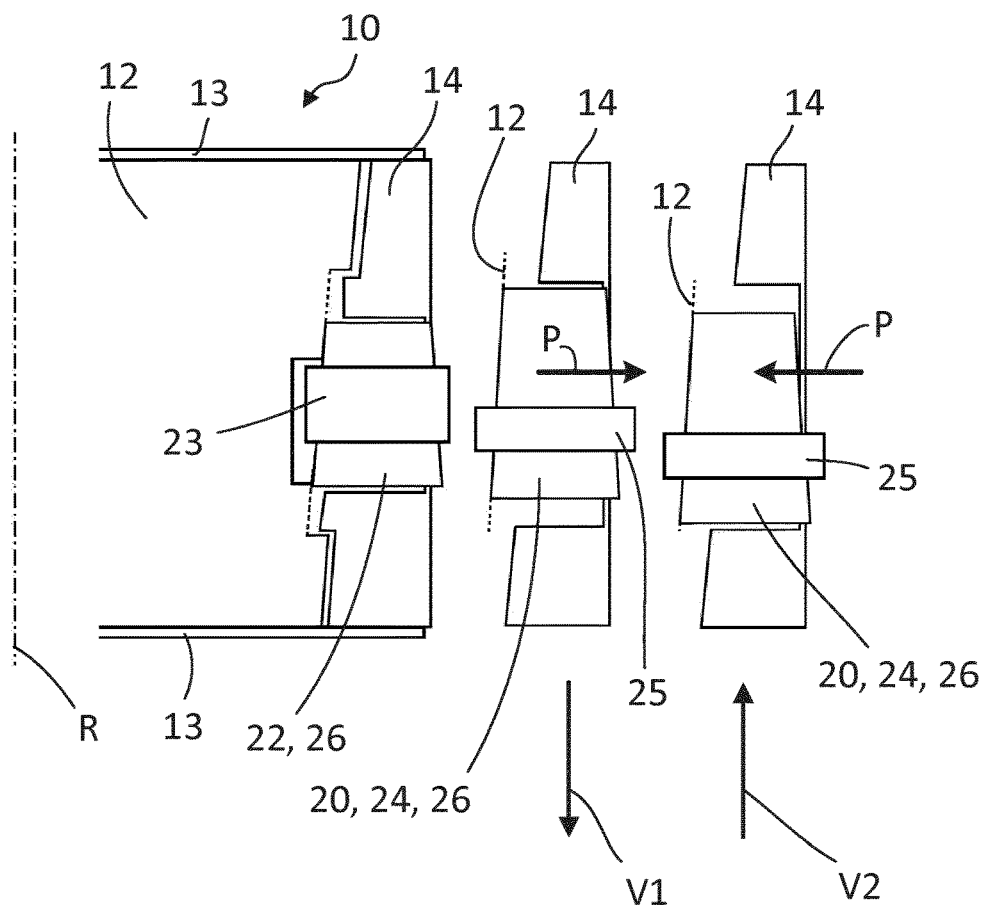
FIG. 2 is a schematic sectional representation of a tool head, to illustrate the functionality of the adjustable tool.

FIG. 2, in the left half of the Figure, then shows half of a tool head 10, comprising an upper and a lower base plate 13, between which a basic body 12 is arranged, this basic body 12 having a conical shape. A bearing portion, or bearing ring 14, which serves, inter alia, to support the first and second tools 20, 22, is indicated by the reference 14. In principle, the configuration comprising the basic body 12, or the base plates 13 and the bearing portion 14, is to be understood as being merely an example. The arrangement, or mounting, of the tools 22 and 20, or 24, may be effected in many ways. In particular, the axial movement capability, or the axial play, along the rotation axis R, may be achieved by various types of design. FIG. 2 serves, in particular, to illustrate the functioning of the first tool, or adjustable tool 20, in this case a forming tool 24, in the right half of the Figure. Here, a roughening tool 22 is realized, fixed along the rotation axis R. If the tool head 10 is directed downward, along the direction of advance V1 (in the middle region of the figure), for example during the insertion of the tool head 10 into a cylinder, this results in the adjustable tool 20, in particular the forming tool 24, being forced radially outward, as indicated by the arrow P, since it moves upward, as it were along the rotation axis R, on the conical basic body 12, and is consequently forced outward. For this purpose, the adjustable tool 20, for its part, has a basic conical shape. During withdrawal from the cylinder, shown in outline in the right half of the Figure (cf. reference V2), a realignment of the adjustable tool 20, or of the forming tool 24, is effected automatically (or as a result of the provision of an adjusting means), such that an engagement region 23 of the roughening tool 22 can then act. The automatic orientation may be effected, in particular, by mounting of the corresponding tool basic bodies 26 with play. The over-dimension is preferably set as indicated in the right half of FIG. 1. By means of this configuration, it can be ensured, at least in the case of this embodiment, that roughening of the cylinder inner surface, or of the webs, is effected as a final machining step during withdrawal from the cylinder.

LIST OF REFERENCE CHARACTERS

10 tool head
12 basic body, cone
14 bearing portion, bearing ring
20 first tool, adjustable tool
22 second tool, roughening tool
23 engagement region of roughening tool
24 forming tool
25 engagement region of forming tool
26 tool body
D22 effective diameter of roughening tool (second tool)
D24 effective diameter of forming tool (first tool)
50 cylinder wall
d radial offset
V1, V2 directions of advance
R rotation axis
P arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tool head for machining an inner surface of a cylinder, the tool head comprising:
    a conically-shaped basic body defining a rotation axis;
    a roughening tool having a radially outward facing cylindrical second engagement region with a coating, wherein the roughening tool is disposed along a circumference of the basic body such that the roughening tool is fixed with respect to the basic body both radially and along the axis of rotation; and
    a forming tool having a radially outward facing cylindrical first engagement region with a smooth or flat surface, wherein the forming tool is disposed along the circumference of the basic body so as to move on the basic body along the axis of rotation to set a radial position of the forming tool relative to the roughening tool during and in response to insertion and withdrawal of the tool head into the cylinder,
    wherein, during insertion of the tool head into the cylinder, the radial position is set by the movement so that the first engagement region extends radially beyond the second engagement region, and
    wherein, during withdrawal of the tool head into the cylinder, the radial position is set by the movement so that the second engagement region extends radially beyond the first engagement region.

2. The tool head according to claim 1, wherein a radial position of the roughening tool is defined.

3. A method for machining an inner surface of a cylinder, comprising the acts of:
    providing the tool head of claim 1;
    machining the inner surface of the cylinder only during insertion of the tool head into the cylinder by the first engagement region of the forming tool bearing against the inner surface of the cylinder; and
    machining the inner surface of the cylinder only during withdrawal of the tool head from the cylinder by the second engagement region of the roughening tool bearing against the inner surface of the cylinder.

4. The method according to claim 3, wherein an effective diameter of the forming tool is reduced during withdrawal of the tool head from the cylinder.

5. The method according to claim 3, further comprising the act of:
    coating the cylinder wall following the machining.

6. The method according to claim 3, wherein the cylinder is an internal combustion engine cylinder.

* * * * *